(12) United States Patent
Yamanaka et al.

(10) Patent No.: US 9,047,549 B2
(45) Date of Patent: Jun. 2, 2015

(54) ANTENNA FOR DIPOLE-TYPE IC TAG, ANTENNA ROLL, AND USAGE METHOD FOR IC TAG

(75) Inventors: Yuji Yamanaka, Ise (JP); Yushi Sato, Ise (JP); Hisakazu Shibata, Ise (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 0 days.

(21) Appl. No.: 13/984,233

(22) PCT Filed: Jul. 29, 2011

(86) PCT No.: PCT/JP2011/067533
§ 371 (c)(1),
(2), (4) Date: Aug. 7, 2013

(87) PCT Pub. No.: WO2012/108071
PCT Pub. Date: Aug. 16, 2012

(65) Prior Publication Data
US 2013/0306743 A1  Nov. 21, 2013

(30) Foreign Application Priority Data
Feb. 8, 2011 (JP) .................. 2011-025345

(51) Int. Cl.
*G06K 19/06* (2006.01)
*G06K 19/077* (2006.01)
*H01Q 9/20* (2006.01)
(Continued)

(52) U.S. Cl.
CPC ............ *G06K 19/07786* (2013.01); *H01Q 9/20* (2013.01); *H01Q 1/2225* (2013.01); *H01Q 1/36* (2013.01)

(58) Field of Classification Search
USPC .......................... 235/492; 343/813, 747, 827
See application file for complete search history.

(56) References Cited

U.S. PATENT DOCUMENTS

2006/0170606 A1  8/2006  Yamagajo et al.
2009/0108996 A1  4/2009  Day
(Continued)

FOREIGN PATENT DOCUMENTS

JP  2006-217000 A  8/2006
JP  2007-249620 A  9/2007
(Continued)

OTHER PUBLICATIONS

International Search Report dated Dec. 6, 2011, issued in corresponding application No. PCT/JP2011/067533.

*Primary Examiner* — Ahshik Kim
(74) *Attorney, Agent, or Firm* — Westerman, Hattori, Daniels & Adrian, LLP

(57) ABSTRACT

To provide an antenna for dipole-type IC tag, which can conform to various IC chip specifications and communication frequencies in a wide area without causing an increase in the size of antenna, while advantageously suppressing a decrease in a communication distance caused by a defect part in an antenna pattern, in an antenna for dipole-type IC tag, an antenna radiation part is configured by extending an antenna wire in a radiation part extending direction, while repeatedly forming a pair of branch paths that branches in a direction intersecting with the radiation part extending direction, and a connection path which connects the pair of branch paths. The connection path is configured to extend in the radiation part extending direction from a junction of a pair of branch paths to a branch point of a next pair of branch paths.

6 Claims, 9 Drawing Sheets

(51) Int. Cl.
*H01Q 1/22* (2006.01)
*H01Q 1/36* (2006.01)

(56) References Cited

U.S. PATENT DOCUMENTS

2009/0201156 A1* 8/2009 Kato ............................ 340/572.5
2009/0278687 A1 11/2009 Kato 2010/0066538 A1* 3/2010 Ogata et al. ................. 340/572.7
2012/0080528 A1* 4/2012 Crowley ........................ 235/492
2012/0293387 A1* 11/2012 Ohno ............................ 343/818

FOREIGN PATENT DOCUMENTS

| JP | 2008-9801 A | 1/2008 |
| JP | 2011-502398 A | 1/2011 |
| WO | 2008/126458 A1 | 12/2008 |

* cited by examiner (a)

(b)

(c)

(d)

(e)

(a)

(b)

(c)

(d)

(e)

(f)

(a)

(b)

ANTENNA FOR DIPOLE-TYPE IC TAG, ANTENNA ROLL, AND USAGE METHOD FOR IC TAG

TECHNICAL FIELD

The present invention relates to an antenna for a dipole-type IC tag, an antenna roll, and an usage method for an IC tag.

BACKGROUND ART

An IC tag also called a radio frequency identification (RFID) tag has been known. In recent years, there has been a need to increase a communication distance to be longer than a conventional one. Accordingly, a method of communication between an IC tag and a reader writer has been changed from an electromagnetic induction method to a radio communication method. A communication frequency has also been changed from a conventional high-frequency (HF) band to an ultrahigh-frequency (UHF) band capable of performing a radio communication, and a half-wave dipole antenna has been frequently used as an IC tag antenna.

A half-wave dipole antenna is a dipole antenna, in which an antenna length that is an effective length of a radiation part of an antenna (described as an antenna radiation part in the present application) is made to be about ½ of a communication wavelength (refer to Patent Literatures 1 and 2, for example).

FIG. 9 shows a basic configuration of a half-wave dipole IC tag antenna. A half-wave dipole antenna shown in the drawing comprises an IC chip mounting part 101 having an IC chip mounting terminal 103 to mount an IC chip (not shown), an impedance adjustment part 102 to adjust impedance of an antenna, and a pair of antenna radiation parts 11.

In the half-wave dipole antenna shown in FIG. 9, a central branch path 10 is composed of an IC chip mounting part 101 and an impedance adjustment part 102, and is divided at two points at which the antenna radiation parts 11 are connected. Of the central branch path 10, a part having an IC chip mounting terminal 103 is an IC chip mounting part 101, and the other part is an impedance adjustment part 102. This configuration constitutes, in a high-frequency circuit, a circuit virtually equivalent to a circuit shown in FIG. 10.

In an IC tag, generally, an IC chip has no power supply, and operates on the power received by an antenna. Therefore, the antenna radiation part 11 is required to supply power to an IC chip by achieving impedance matching with a not-shown IC chip to be used by connecting to an IC chip mounting terminal 103.

CITATION LIST

Patent Literature

Patent Literature 1: Japanese Unexamined Patent Application Publication No. 2006-217000
Patent Literature 2: Japanese Unexamined Patent Application Publication No. 2007-249620

SUMMARY OF THE INVENTION

Problems to be Solved by the Invention

Recently, an IC tag has been requested to extend a communication distance to be longer than a conventional one. Accordingly, a method of communication has been changed to a radio communication method using a dipole antenna. This tends to increase the size of an antenna, compared with a loop antenna or a coil antenna in an electromagnetic induction method of communication. Thus, in order to prevent an increase in the size of an antenna, a UHF band with a high communication frequency is used, an antenna radiation part is bent like a meander (refer to Patent Literature 1, for example), or a pattern of an antenna radiation part is made thin.

However, in an IC tag antenna that is an antenna used for a card-like or sheet-like IC tag, an antenna pattern is formed by etching or printing, and a thin antenna pattern has a problem that a defect part is likely to occur during manufacturing or in use.

If a defect part occurs in an antenna pattern, even an alternating current becomes very difficult to flow, and an effective length of a whole antenna is greatly changed, and a current distribution is greatly changed. When a current distribution is changed, there arises a problem that a communication distance of an antenna is greatly decreased.

Further, a thickness of a pattern of an antenna radiation part has an effect on a correlation between a communication frequency and antenna impedance. When a pattern is thin, antenna impedance is likely to change by a change in a communication frequency, and an applicable communication frequency range is reduced.

The present invention has been made to solve the above problems. Accordingly, it is an object of the present invention to provide an antenna for a dipole-type IC tag, an antenna roll, and an usage method for an IC tag, which can conform to various IC chip specifications and communication frequencies in a wide area without causing an increase in the size of an antenna, while advantageously suppressing a decrease in a communication distance caused by a defect part in an antenna pattern.

Means for Solving the Problems

An antenna for a dipole-type IC tag according to the present invention is provided with the following means in order to achieve the above object.

An antenna for a dipole-type IC tag according to the present invention is provided with a pair of antenna radiation parts extending in directions opposite to each other, the each antenna radiation part is configured by repeatedly forming a pair of branch paths branching in a direction intersecting with a radiation part extending direction and a connection path connecting the pair of branch paths along a radiation part extending direction, and the connection path is configured to extend in the radiation part extending direction from a junction of a pair of branch paths to a branch point of a next pair of branch paths.

Branching and connecting are desirably regular. "Regular" mentioned here includes not only a configuration that branching and connecting are repeated at a predetermined pitch in a radiation part extending direction, and a configuration that a shape of a line of a branched part (hereinafter, a branch path) is equal, but also a configuration that a pitch and shape of a branch path is changed according to a predetermined rule.

In an antenna for a dipole-type IC tag, when ensuring an effective antenna length by bending an antenna radiation part like a meander, etc, if a defect occurs in a part of an antenna pattern, even an alternating current becomes very difficult to flow, and an effective antenna length is largely changed. Thus, a current distribution is greatly changed.

In the present invention, even if a defect occurs in one branch path in a part where an antenna wire is branched, a current due to flow there flows in the other branch path by bypassing the defect, a change in an effective length of a whole antenna can be suppressed, and suitable radiation characteristics can be maintained.

Further, although an effective antenna length changes when a defect occurs in a connection path in the antenna for a dipole-type IC tag according to the present invention, as a connection path faces the radiation part extending direction, the length of a radiation part extending direction can be reduced, and the width of an antenna wire can be made thicker than that of a branch path. In other words, there is little possibility of a defect part that completely breaks a thick short connection path during manufacturing or in use, and it is easy to make the antenna shape difficult to cause a defect without affecting the antenna size in the radiation part extending direction.

As described above, the configuration of the present invention can provide an antenna for a dipole-type IC tag that advantageously suppresses a decrease in a communication distance caused by a defect part in an antenna pattern.

Further, like a common antenna for a dipole-type IC tag, it is possible to suppress an effect on a communication distance caused by a change in a communication frequency by increasing the width of an antenna radiation part. As the width of an antenna wire is thicker than that of a branch path in a connection path, and a pair of branch paths is connected in parallel in a branch path, substantially the same effect as making the wire thick is achieved.

Further, in the antenna for the dipole-type IC tag of the present invention, as a specific aspect, an antenna radiation part is composed of antenna patterns formed as connection paths by superimposing or shorting conductor parts formed like a pair of meanders at two or more locations.

By providing two or more connection paths, a branch path can be divided into two or more sections and the effect of defect part of branch path can be minimized. This makes it possible to provide a stronger antenna for the dipole-type IC tag in a defect part in an antenna pattern. Further, as a part between the conductor parts like a pair of meanders are merely superimposed or shorted, the configuration is simplified.

Further, in the antenna for the dipole-type IC tag of the present invention, it is preferable that a branch path from a branch point to a junction is formed like a loop, a clearance is provided between adjacent loops, a connection path is broken in the clearance, and thereby an antenna radiation part located outside the broken part can be separated.

In the aforementioned configuration, by using a basic aspect of the present invention that branching and connecting are repeated, it is possible to provide an antenna for dipole-type IC tag that is easy to adjust antenna characteristics by IC chip characteristics, and conformable to multiple specifications.

Further, in the antenna for dipole-type IC tag of the present invention, it is preferable that an antenna pattern has a pair of central branch paths that branches in a direction intersecting with a radiation part extending direction in the middle of a radiation part extending direction, and has an antenna radiation part on both sides of a junction of both central branch paths; an IC chip mounting part is formed by providing an IC chip mounting terminal in one of the central branch path, and the other central branch path is formed as an impedance adjustment part; and a connection path of an antenna radiation part nearest to a central branch path is separated into two sections along a radiation part extending direction, and thereby the separated sections can belong to a central branch path together with a line that is a new branch path of an antenna radiation part.

In such an antenna provided with an impedance adjustment part in a central branch path, by using the advantage of the present invention able to reasonably increase the line width of a connection path, a part of an antenna radiation part can be formed as an impedance adjustment part simply by making a slit in a connection path along a radiation part extending direction, and an antenna impedance can be adjusted by changing a form of a central branch path.

With this configuration, it is possible to provide an antenna for dipole-type IC tag that can preferably conform to multiple IC chip specifications and communication frequencies. As an example with an IC chip added to the antenna for dipole-type IC tag described above, there is an antenna in which an IC chip mounting part is provided between a pair of antenna radiation parts, and an IC chip is mounted on the IC chip mounting part. On the other hand, if a number of antenna patterns of the above-mentioned antenna for dipole-type IC tag are formed along a take-up direction on a substrate that can be taken up in a form of a roll, and the substrate is taken up in a form of a roll as an antenna roll, it is possible to provide a large number of the antennas for dipole-type IC tag.

Further, if an IC tag having a pair of branch path branching in a direction intersecting with a radiation part extending direction in at least one location of an antenna radiation part of an IC tag antenna is used while having the branch path, an operational effect according to the above fact, preferably suppressing a decrease in a communication distance caused by a defect part in an antenna pattern occurred in use, is achieved.

In other words, although it is desirable to regularly repeat branching and connecting, if a branch path is provided in at least one location, a decrease in a communication distance is suppressed even if a defect part occurs in a branch path, and compared with a case having no branch path, the effect of a defect can be suppressed.

With this configuration, for the IC tag having an antenna radiation portion of such form, it is possible to provide a new usage of an IC tag that preferably suppresses the effect of a defect part.

Effect of the Invention

According to the present invention, as explained above, it is possible to provide an antenna for dipole-type IC tag, an antenna roll, and an usage method for an IC tag, which can advantageously suppress a decrease in a communication distance caused by a defect part in an antenna pattern, and can conform to various IC chip specifications and communication frequencies without causing an increase in the size of an antenna.

MODES FOR CARRYING OUT THE INVENTION

Hereinafter, embodiments of the present invention will be described with reference to accompanying drawings.

Figure 1:
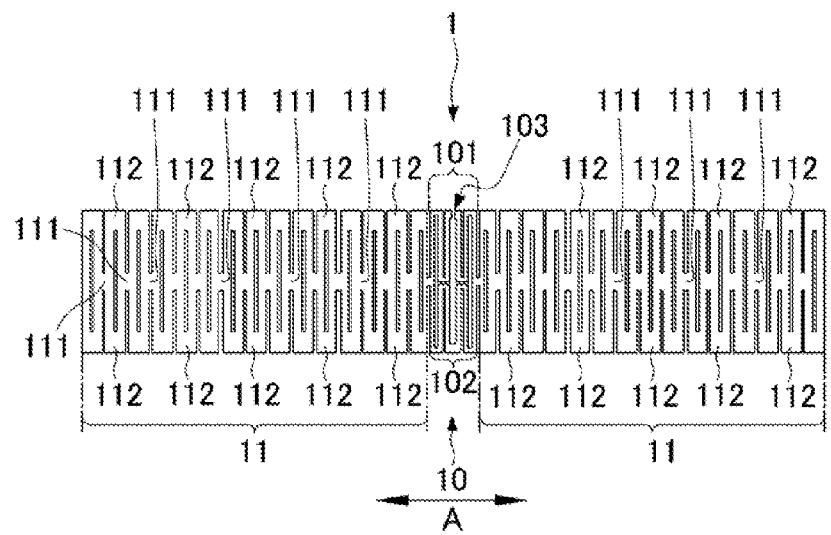
FIG. 1 (a) through (e) show antenna patterns of an antenna for a dipole-type IC tag according to an embodiment of the present invention.
Figure 1:
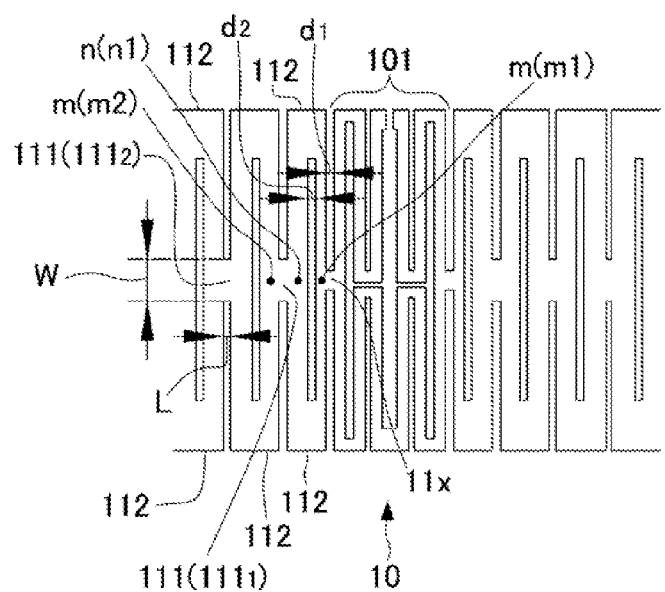
Figure 1:
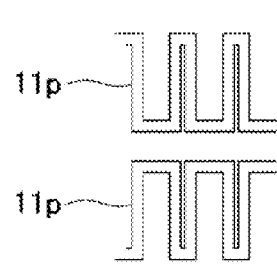
Figure 1:
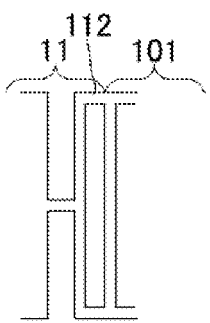
Figure 1:
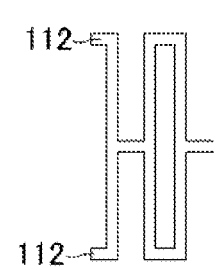
Figure 8:
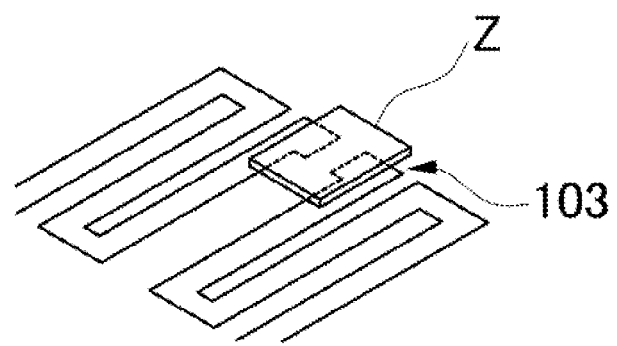
FIG. 8 is a diagram showing an aspect of mounting an IC chip on an antenna for a dipole-type IC tag.
Figure 9:
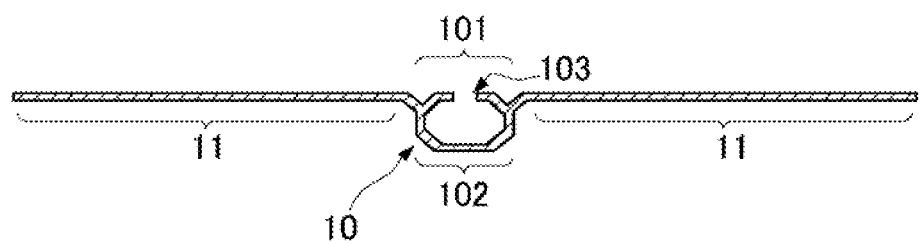
FIG. 9 is a diagram showing a basic configuration of a half-wavelength dipole antenna.
Figure 10:
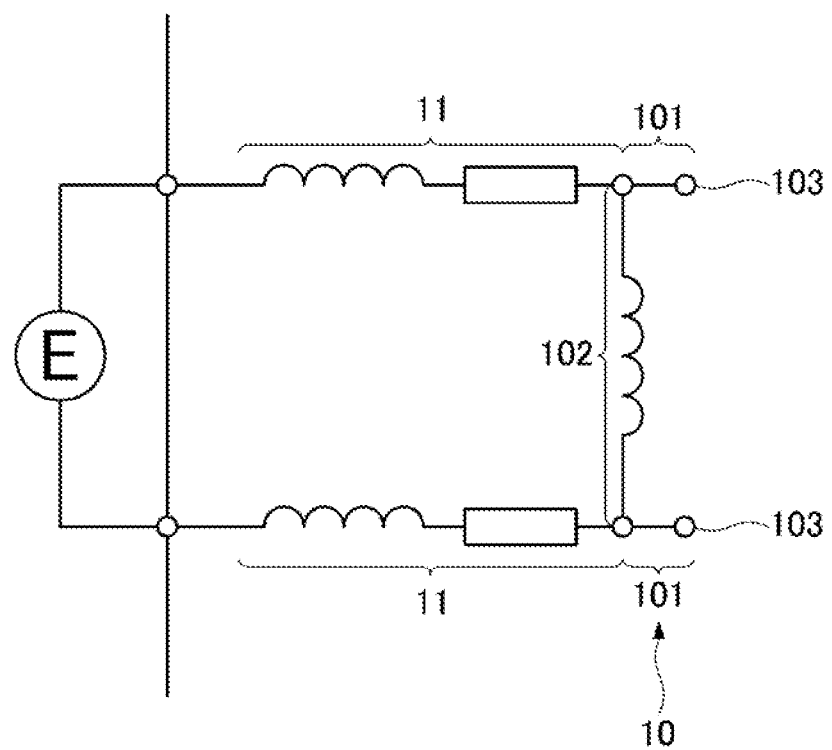
FIG. 10 is a virtual equivalent circuit diagram of a basic dipole antenna.

FIG. 1(a) shows an antenna for dipole-type IC tag 1 according to the present embodiment. In an antenna for dipole-type IC tag according to the present embodiment, like a common antenna for half-wave dipole-type IC tag, a central branch path 10 is comprised of an IC chip mounting part 101 and an impedance adjustment part 102 in a central part of the antenna, a pair of antenna radiation parts 11 branches from the central branch path 10, and extends in a radiation part extending direction A, forming antenna patterns. The antenna is configured so that an effective antenna length of the antenna radiation part 11 becomes approximately ½ of a target communication wavelength. Of the central branch path 10, a part having an IC chip mounting terminal 103 is an IC chip mounting part 101, and the other part is an impedance adjustment part 102. Of an antenna pattern, on the IC chip mounting part 103 located between a pair of antenna radiation parts 11 and 11, an IC chip Z is mounted as shown in FIG. 8, and is used as an IC tag. Around the IC chip mounting terminal 103, a chip bump pad (not shown) for stabilizing an IC chip not forming an antenna may be provided if necessary.

Generally, an IC tag is used in being buried in (or pasted to) a card or a sheet, and a planar antenna is used for an IC tag antenna. As an antenna wire material, various conductive materials such as copper, aluminum, and silver paste can be used. A film thickness of an antenna wire material may be set to a thickness that an uneven film thickness occurred during manufacturing, etc. does not give a substantial effect on the impedance due to the skin effect. As an antenna substrate, a dielectric material such as PET, PP, or PVC can be used.

As a pattern forming method of a planar antenna, various methods such as etching or printing have been used.

In an embodiment of the present invention, an antenna pattern of a pair of antenna radiation parts 11 extending in directions opposite to each other branches to two directions perpendicular to a radiation part extending direction A, forming a loop in a shape that a branch path 112 folds back, and connects again in the direction perpendicular to the radiation part extending direction A. Branching and connecting may be done at least once, but are preferably repeated several times in order to make a more effective antenna pattern.

Next, a specific aspect of the antenna radiation part 11 will be explained. The antenna radiation part 11 is provided as a pair on both sides of the central branch path 10. A substantial configuration of the antenna radiation part is the same, and only the left half of the drawing will be explained.

A pattern of the antenna radiation part 11 branching from a junction of the central branch paths 10 branches to two directions perpendicular to the radiation part extending direction A at a branch point m (m1) arrived first from a connection path 11x in the base of the antenna radiation part 11, then connects at a junction n (n1), as shown enlarged in FIG. 1(b). A connection path 111 ($111_1$) extends further from the junction n (n1) to the radiation part extending direction A, and branches to two directions perpendicular to the radiation part extending direction A at a next branch point m (m2). The above-mentioned connection path 11x in the base of the antenna radiation part 11 keeps a distance $d_1$ that does not cause a short circuit between the central branch path 10 and the branch path 112. Each branch path 112 branched to two directions keeps a distance $d_2$ that does not cause a short circuit between an outward path and a return path. Further, the connection path 111 ($111_1$), etc. located ahead keeps a clearance L that does not cause a short circuit between the branch path 112 and branch path 112. In this way, branching and connecting are repeated, so that an effective antenna length of the antenna radiation part 11 becomes appropriately ½ of a target communication wavelength. In this case, a pair of branch paths 112 branched to two directions forms a substantially rectangular loop.

In other words, the antenna radiation part 11 is composed of an antenna pattern formed as a connection path 111 by superimposing or shorting a parallel part of a conductor part 11p forming a pair of meanders, that is, a folded portion located close to each other of the folded part extending in the radiation part extending direction A, at several locations.

In this embodiment, an aspect that the antenna radiation part 11 branches from one point of the central branch path 10 has been explained. However, as shown in FIG. 1(d), the antenna radiation part 11 may branch from two points of the central branch path 10, and may become a branch path 112 immediately after branching. A terminal of the antenna radiation part 11 may not be connected, and may be a branch path 112 as shown in FIG. 1(e).

Further, in this embodiment, the shape of the branch path 112 has been explained as substantially rectangular branching in a vertical direction from the connection path 111 and folding back from there. However, the branch path 112 is not to be limited to this configuration, and may be configured in various forms according to a direction of branching, a number of folding-back, and a shape of a folding-back point, etc. The branch path 112 may be configured to be any form including chamfering of an edge of a corner at a folding-back point, and filleting, as long as impedance matching with an IC chip can be taken. For example, the branch path 112 may be configured as a loop including curves and substantially triangular shape as a whole, or a pair of branch paths 112 itself may form a meander.

Figure 4:
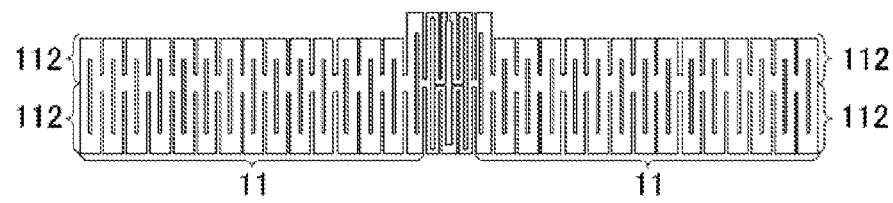
FIG. 4 (a) through (f) show antenna patterns in other embodiments of the present invention.
Figure 4:
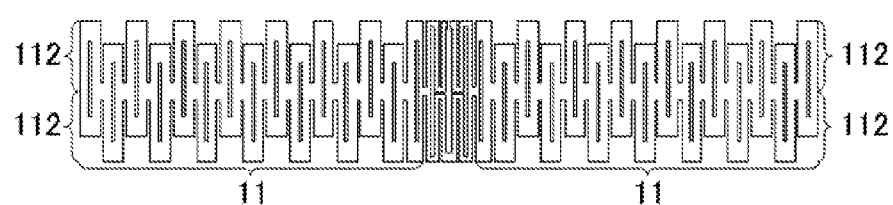
Figure 4:
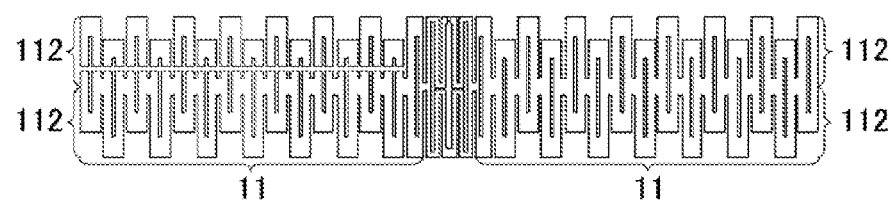
Figure 4:
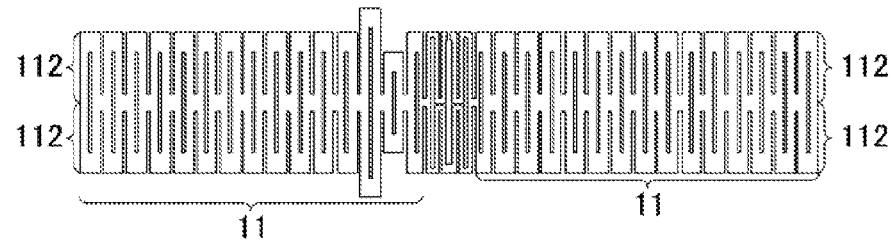
Figure 4:
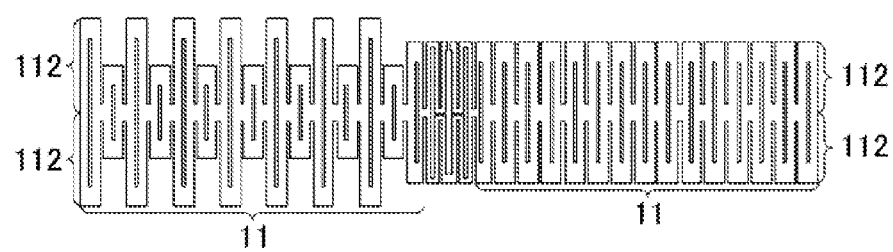
Figure 4:
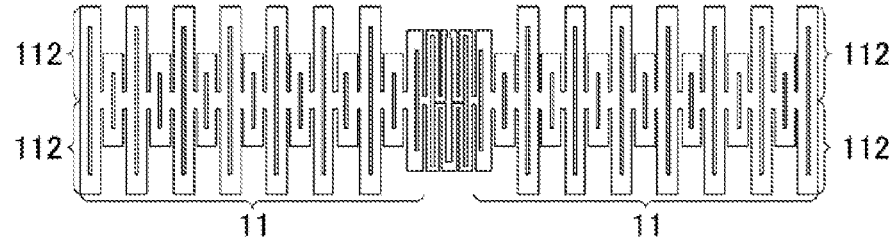
Figure 5:
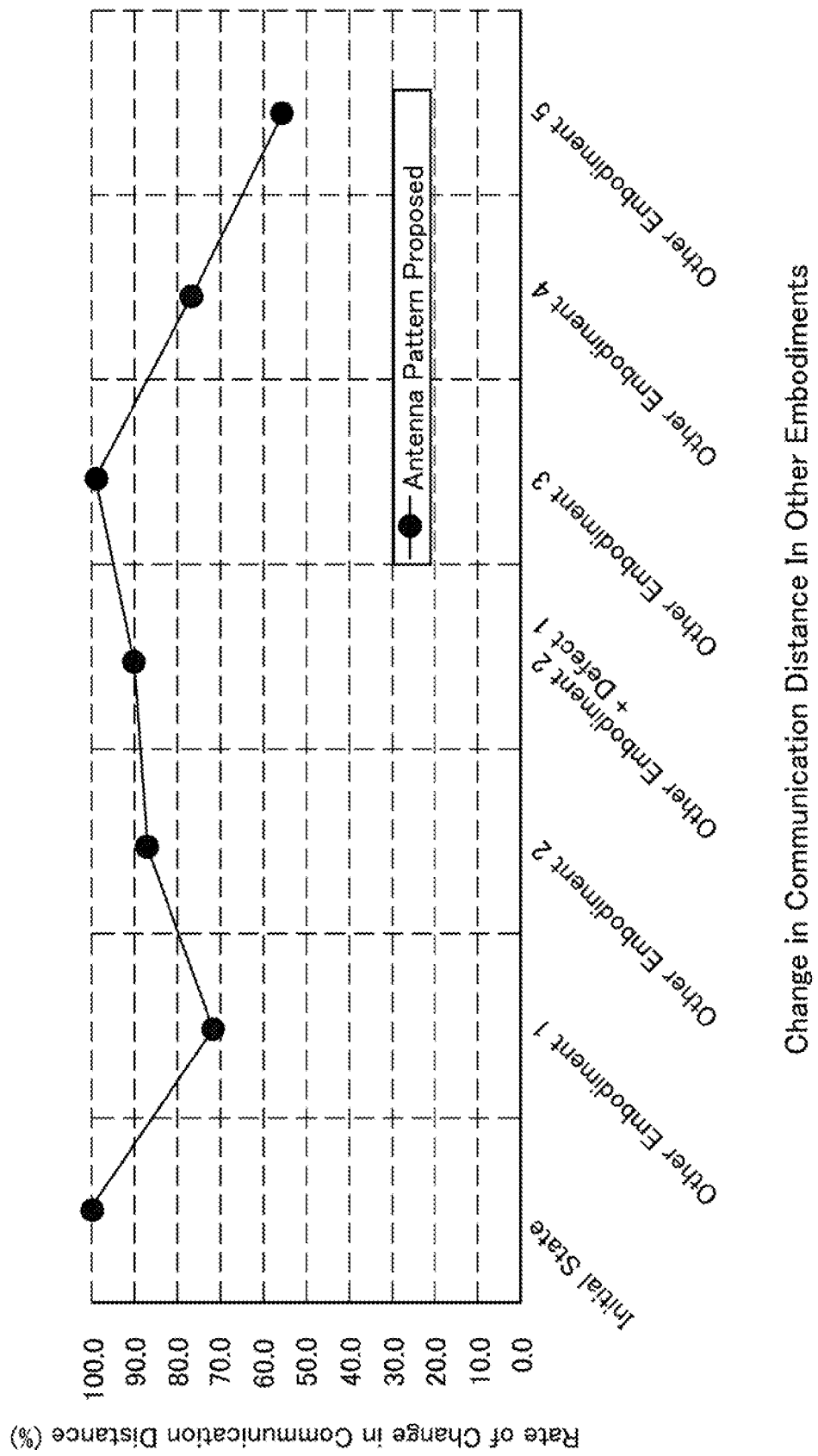
FIG. 5 is a graph showing the results of simulations for the antenna patterns shown in FIGS. 1 and 4.

The applicant has performed experiments by simulation of a communication distance in various shapes of the branch path 112 as shown in FIG. 4, and studied the effects. As seen from the results of the experiments shown in FIG. 5, a fetal decrease in a communication distance does not occur in any antenna. In other words, no fatal decrease in a communication distance occurs in any case that the form of the branch path 112 is different (FIG. 4(d), (e), (f)), a pair of branch paths 112 is asymmetrical (FIG. 4(a), (b)), and a pair of antenna radiation parts 11 is asymmetrical (FIG. 4(d), (e)).

Further, by using simulations, the applicant has performed experiments on an effect on a communication distance caused by a defect part 113 in an antenna pattern in the antenna for half-wave dipole-type IC tag 1 of the present embodiment.

Figure 2:
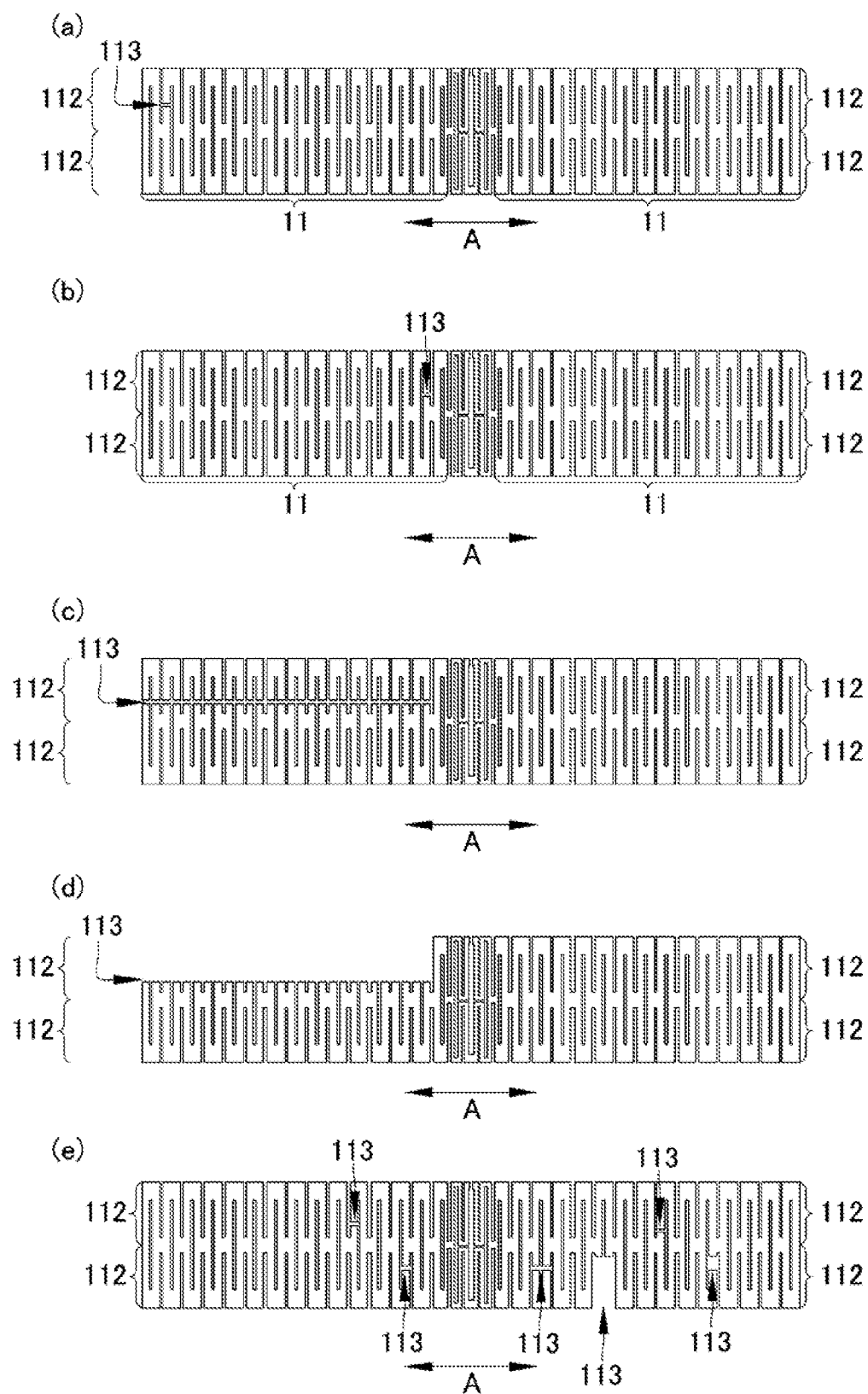
FIG. 2 (a) through (e) show antenna patterns, for which a pattern defect simulation has been performed according to the present invention.
Figure 3:
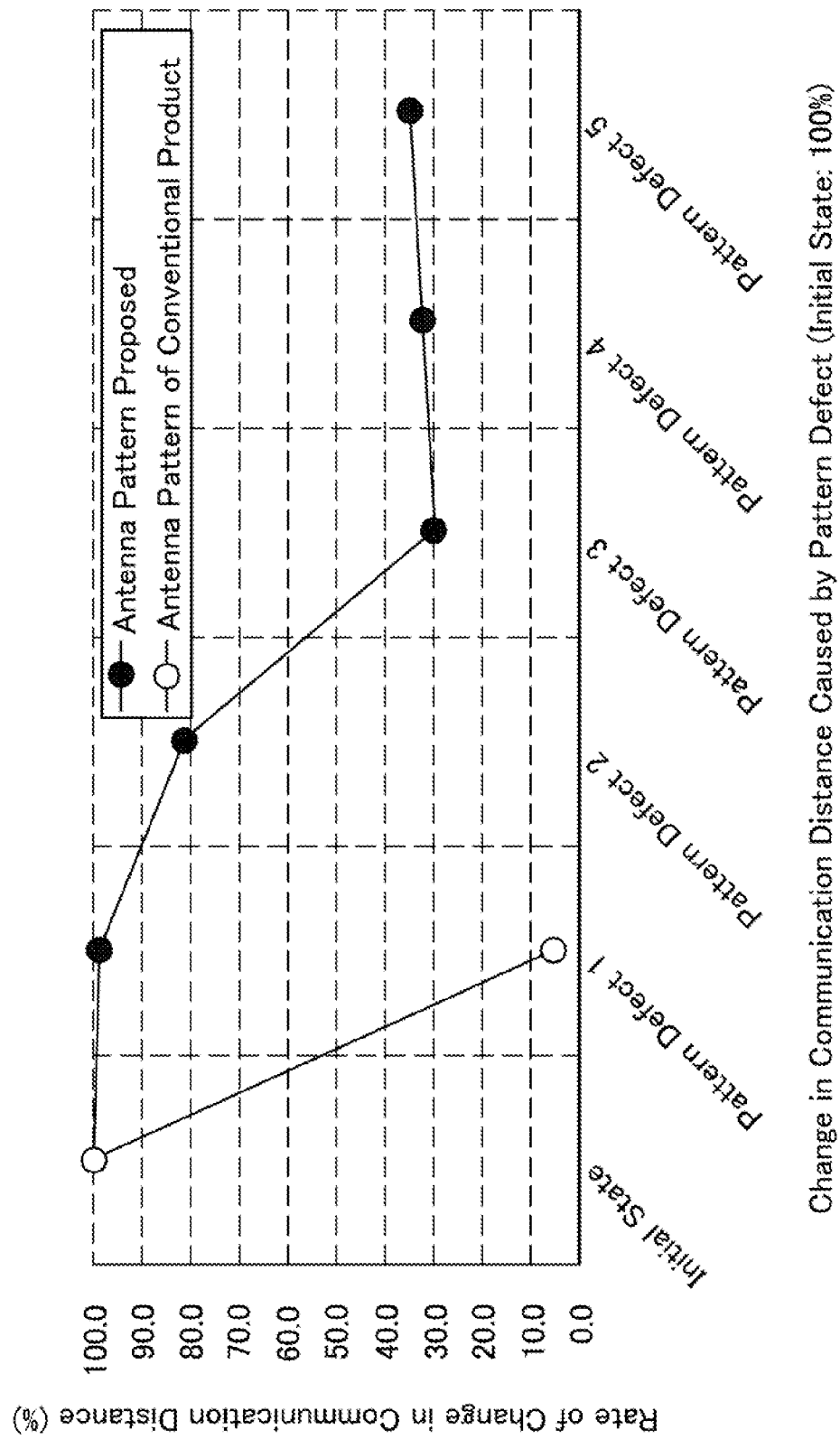
FIG. 3 is a graph showing the results of simulations for the antenna patterns shown in FIGS. 1, 2 and 6.

FIG. 2 shows the states of the defect part 113 in an antenna pattern in the simulations performed by the applicant. FIG. 3 shows the results of the simulation experiments. In the antenna of the present invention as shown in FIG. 3, it is proved that the effect of the defect part 113 on a communication distance is a little, and a fatal decrease in a communication distance does not occur with respect to various defect parts 113 as shown in FIG. 2.

FIG. 2(a) shows a case where a defect part 113 occurs in one location of the branch path 112 near the tip of the antenna radiation part 11 (a pattern defect 1).

FIG. 2(b) shows a case where a defect part 113 occurs in one location of the branch path 112 near the base of the antenna radiation part 11 (a pattern defect 2).

FIG. 2(c) shows a case where a defect part 113 occur all over one branch path 112 of the antenna radiation part 11 of one side (a pattern defect 3).

FIG. 2(d) shows a case where a defect part 113 occurs in all tips of one branch path 112 of the antenna radiation part 11 of one side (a pattern defect 4).

FIG. 2(e) shows a case where a defect part 113 occurs at various locations of the branch path 112 of the antenna radiation part 11 (a pattern defect 5). However, a defect part 113 does not occur in both of a pair of branch paths 112.

Even in the present invention, when a defect part 113 occurs in the connection path 111, an effective antenna length changes, but the connection path 111 can be decreased in the length L in the radiation part extending direction A (see FIG. 1(b). This corresponds to a clearance between the branch paths 112 and 112.), and can be increased in the thickness of the wire width W (see FIG. 1(b).) compared with the branch path 112. In other words, as there is a very low possibility to generate a defect part 113 that completely breaks a thick short connection path 111 during manufacturing and in use, it is easy to form the antenna difficult to cause a defect without affecting the antenna size in the radiation part extending direction A.

Figure 6:
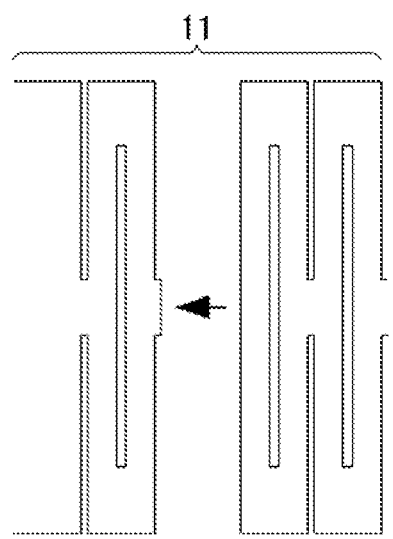
FIGS. 6 (a) and (b) show examples of specification changes of an IC tag antenna according to the present invention.
Figure 6:
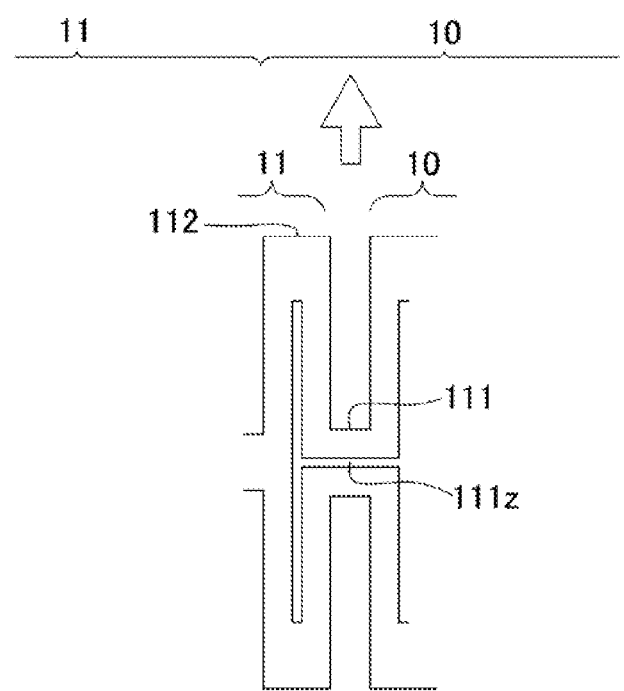

Further, in the present embodiment, there is also provided a method of adjusting an antenna for half-wave dipole-type IC tag 1 by a communication frequency and specifications of an IC chip to be mounted. For example, there is a clearance L for preventing a short circuit between adjacent branch paths 112. In a location near a tip of a pair of antenna radiation parts 11, each connection path 111 can be broken in a clearance between adjacent branch paths 112, and an antenna radiation part 11 on the distal side of the broken part can be separated as shown in FIG. 6(a). It is thus possible to change a corresponding communication frequency by changing an effective antenna length of the antenna radiation part 11.

It is also possible to conform to various IC chip specifications by making a slit 111z along the radiation part extending direction A in the connection path 111 nearest to the central branch path 10 of the antenna radiation part 11, as shown in FIG. 6(b), separating the connection path 111 in a direction perpendicular to the radiation part extending direction A, moving the separation path to the central branch path 10 together with the branch path 112 that is a part of the antenna radiation part 11, and extending the wire length of the impedance adjustment part 102.

In addition, as already explained, FIG. 3 shows a change in a communication distance according to states of a defect part 113, by taking a communication distance on the vertical axis. A change in a communication distance is caused by a change in impedance. By positively using this fact, a preferable usage method can be obtained by creating a defect part 113 for impedance adjustment by intentionally breaking one of a pair of branch paths 112 in accordance with specifications of an IC chip to be mounted.

Moreover, in the present invention, a stable effectiveness is ensured by an antenna pattern that repeats branching and connecting. Even if an IC tag having a branch path 112 in at least one location of the antenna radiation part 11 of the IC tag antenna 1 is used while having a branch path 112, as long as conditions such as a position of a branch path 112 are conformable, it is possible to preferably suppress a decrease in a communication distance caused by a defect part 113 in an antenna pattern. Furthermore, it is of course desirable to regularly repeat branching and connecting, but as long as a branch path 112 is provided in at least one location at the time of use, even if a defect part 113 occurs in the branch path 112, a decrease in a communication distance is suppressed, and as compared with a case where no a branch path 112 is provided, it can be said that the effect of a defect part 113 can be suppressed. In that case, in a range that a certain effect can be obtained, the connection path 111 is not necessarily required to face the radiation part extending direction A, and may face a direction intersecting with (perpendicular to) the radiation part extending direction A.

Figure 7:
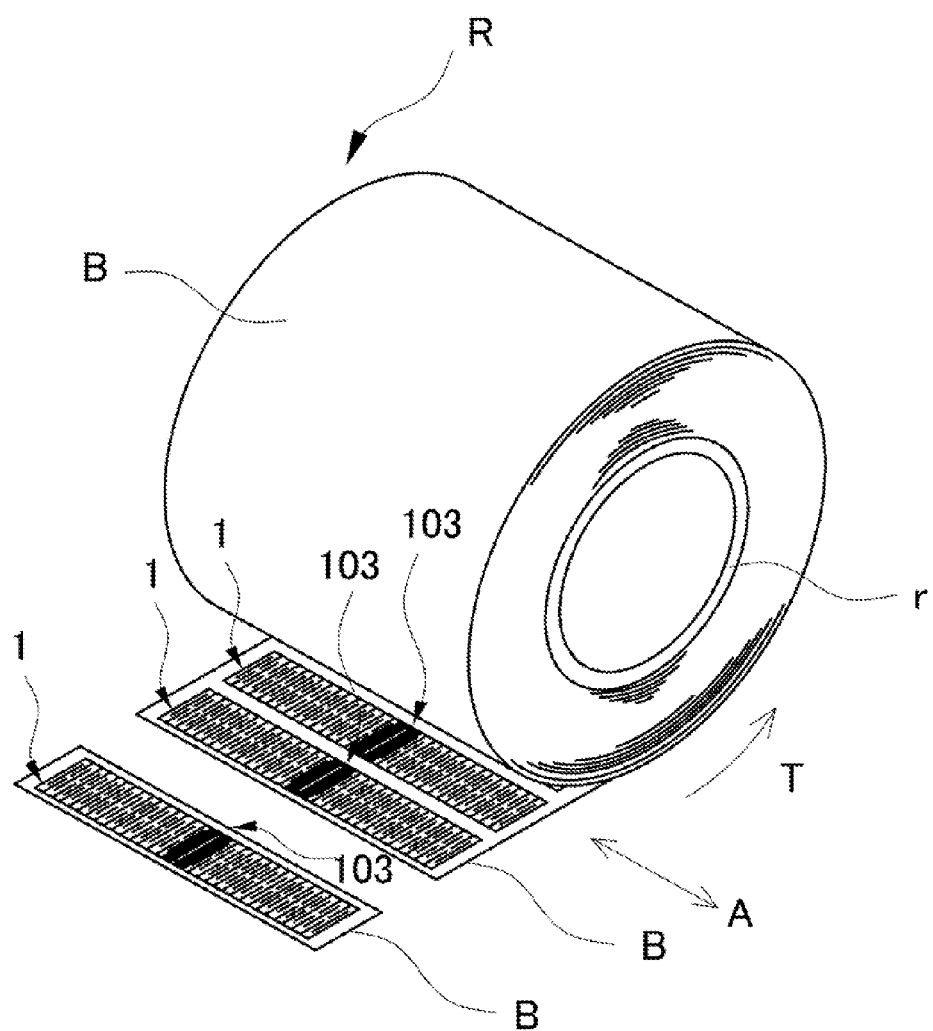
FIG. 7 is a diagram showing an antenna roll that takes up an antenna for a dipole-type IC tag in a form of a roll.

FIG. 7 shows an antenna roll R configured to be able to supply a large number of antennas for dipole-type IC tag 1 in the form of a roll.

The antenna roll R is formed by making a large number of antenna patterns of the antenna for dipole-type IC tag 1 at a predetermined pitch along a take-up direction T on a tape-like substrate B that can be taken up in the form of a roll, and taking up the substrate B around a core r. The antenna roll R may be formed by taking up the substrate B in the form of a roll together with an IC chip Z in a state that the IC chip Z is mounted on the IC chip mounting part 103 of each antenna pattern, as shown in FIG. 8. An antenna pattern is formed on the substrate B by evaporating, etching, screen printing, or the like. Incidentally, in FIG. 7, an antenna pattern is formed so that a direction perpendicular to the radiation part extending direction A becomes a take-up direction T.

In the same drawing, the surface that an antenna pattern is formed is a surface that becomes an inner circumferential side of the substrate B in a taken-up state, but an antenna pattern may be formed on a surface that becomes an outer circumferential side of the substrate B in a taken-up state.

When using, feed the substrate B from the antenna roll R in a direction opposite to the take-up direction T, cut off an antenna pattern of each antenna for dipole-type IC tag 1 together with the substrate B as illustrated, or peel off an antenna pattern from the substrate B. Then, adjust impedance by separating a part of an antenna pattern if necessary, and attach the antenna pattern to an object by gluing or other methods. Such an antenna roll R makes it possible to supply a large amount of the antenna for dipole-type IC tag 1 of the present embodiment in a compact state.

A specific configuration of each part is not to be limited only to the embodiments described above, and various modifications are possible without departing from the spirit and essential characteristics of the present invention.

INDUSTRIAL APPLICABILITY

According to the present invention described in detail hereinbefore, it is possible to provide an antenna for dipole-type IC tag, an antenna roll, and a usage method for an IC tag, which can preferably suppress a decrease in a communication distance caused by a defect part in an antenna pattern, and can preferably conform to various IC chip specifications and communication frequencies, without causing an increase in the size of the antenna.

The invention claimed is:
1. An antenna for a dipole-type IC tag, comprising:
a pair of antenna radiation parts extending in directions opposite to each other, wherein
the each antenna radiation part is configured by repeatedly forming a pair of branch paths branching in a direction intersecting with a radiation part extending direction and a connection path connecting the pair of branch paths in each radiation part extending direction, the connection path is configured to extend in the radiation part extending direction from a junction of a pair of branch paths to a branch point of a next pair of branch paths, the antenna radiation part is composed of antenna patterns formed as connection paths by superimposing or shorting conductor parts formed like a pair of meanders at two or more locations, the branch path from the branch point to the junction is formed in a loop shape, a clearance is provided between adjacent loops, a connection path is broken in the clearance, and thereby an antenna radiation part located outside a broken point can be separated, the pair of branch paths being arranged in a substantially rectangular shape, and the substantially rectangular shape being longer in a direction crossing the radiation part extending direction than the radiation part extending direction.

2. An antenna for a dipole-type IC tag, comprising:

a pair of antenna radiation parts extending in directions opposite to each other, wherein the each antenna radiation part is configured by repeatedly forming a pair of branch paths branching in a direction intersecting with a radiation part extending direction and a connection path connecting the pair of branch paths in each radiation part extending direction, the connection path is configured to extend in the radiation part extending direction from a junction of a pair of branch paths to a branch point of a next pair of branch paths, the antenna radiation part is composed of antenna patterns formed as connection paths by superimposing or shorting conductor parts formed like a pair of meanders at two or more locations, the antenna pattern is provided with a pair of central branch paths that branches in a direction intersecting with a radiation part extending direction in the middle of a radiation part extending direction, and is provided with the antenna radiation part on both sides of a junction of the both central branch paths; one of the central branch paths is formed as an IC chip mounting part, and the other is formed as an impedance adjustment part; a connection path located between the central branch path and a branch path belonging to an antenna radiation part nearest to the central branch path is separated into two parts along a radiation part extending direction, and thereby a separation path and the branch path can belong to the central branch path side, the pair of branch paths being arranged in a substantially rectangular shape, and the substantially rectangular shape being longer in a direction crossing the radiation part extending direction than the radiation part extending direction.

3. An antenna roll characterized by forming a large number of antenna patterns of an antenna for dipole-type IC tag on a substrate that can be taken up in a roll form along a take-up direction, and taking up the substrate in a roll form, the antenna for dipole-type IC tag comprising a pair of antenna radiation parts extending in directions opposite to each other, wherein the each antenna radiation part is configured by repeatedly forming a pair of branch paths branching in a direction intersecting with a radiation part extending direction and a connection path connecting the pair of branch paths in each radiation part extending direction, and the connection path is configured to extend from a junction of a pair of branch paths to a branch point of a next pair of branch paths, the antenna radiation part is composed of antenna patterns formed as connection paths by superimposing or shorting conductor parts formed like a pair of meanders at two or more locations, the branch path from the branch point to the junction is formed in a loop shape, a clearance is provided between adjacent loops, a connection path is broken in the clearance, and thereby an antenna radiation part located outside a broken point can be separated, the pair of branch paths are arranged in a substantially rectangular shape, and the substantially rectangular shape is longer in a direction crossing the radiation part extending direction than the radiation part extending direction.

4. The antenna roll according to claim 3, wherein an IC chip mounting part is provided between the pair of antenna radiation parts, and an IC chip is mounted on the IC chip mounting part.

5. A method of using an IC tag having the antenna according to claim 1, wherein the IC tag is used while having the branch paths.

6. A method of using an IC tag having the antenna according to claim 2, wherein the IC tag is used while having the branch paths.

* * * * *